Patented June 21, 1932

1,864,426

UNITED STATES PATENT OFFICE

HENRY A. GARDNER, OF WASHINGTON, DISTRICT OF COLUMBIA

DELUSTERED REGENERATED CELLULOSE

No Drawing.   Application filed October 25, 1929. Serial No. 402,552.

This invention relates to delustered regenerated cellulose; and it comprises a method of delustering artificial silk, or rayon, threads, sheets, films, etc. made by precipitation from alkaline cellulose solutions, such as viscose, of a filament coming from a spinneret, wherein the alkaline solution is admixed prior to extrusion with a small proportion of an alkaline solution of a resin, or like body, capable of co-precipitation with the cellulose, the amount of the resin being usually about 5 per cent of the cellulose and the most advantageous resin being a toluene sulfo amid-resin; and it further comprises an article formed of precipitated cellulose containing a co-precipitated resinous body, advantageously a toluene sulfo amid resin, such as para toluene methylene sulfo amid, intimately dispersed therethrough in such a form as to give a slight haze or an opalescence to transmitted light; all as more fully hereinafter set forth and as claimed.

Commercial forms of regenerated cellulose, such as rayon, yarn, and sheets and films of the nature of what is commercially known as cellophane, etc. are open to several objections. For one thing, the thread or yarn is not of even "level" appearance. For another thing, the transparency and luster are greater than is usually desirable; a more silky appearance being wanted. Still another objection is that the material is more or less hygroscopic and is not resistant to water. The wet strength of rayon fabrics is considerably less than the dry strength. And, probably because of the hygroscopic nature of the material, the electrical properties are not satisfactory; the resistance and dielectric properties are not considered good. For this reason an extensive use of such thread in wire insulation or of sheets and films for other electrical purposes is precluded.

Attempts have been made to obviate these objections by emulsifying mineral oils in the viscose solutions from which the regenerated cellulose is made; but these emulsions do not give satisfactory results. The appearance of the rayon thread and yarn is less even and level than with untreated viscose and the dry strength is considerably reduced while the wet strength is not improved. The use of emulsified mineral oils therefore, while it has been proposed, has not gone into extensive use. It is the object of the present invention to produce an improved delustered regenerated cellulose of lessened hygroscopicity.

I have found that by the simple expedient of incorporating into an alkaline cellulose solution, such as viscose, prior to regeneration of the cellulose, a small amount of a body capable of coprecipitation with cellulose in opaque, finely divided form, I can produce a certain amount of internal haze or opalescence which gives a more attractive thread. Thread is delustered to an extent and in a way which makes it more nearly comparable with natural silk. The haze producing body is advantageously of resinous nature. The amount of coprecipitated resin which will give the desired amount of delustering, will also considerably improve the electrical properties of the regenerated cellulose and improve the resistance to the action of water.

So far as my present knowledge extends, the best of these bodies for incorporation in the alkaline cellulose solution are alkaline solutions of resin and in particular a toluene sulfo amid resin, such as para toluene methylene sulfo amid dissolved in caustic soda solution. However, alkaline solutions or soaps of other ordinary, natural or artificial light-colored resins may be used. Other materials soluble in alkaline solutions and precipitated by acid can be used in lieu of resin, but most of them do not give the extremely fine dispersion afforded by resins and desirable in forming a haze or opalescence.

After the addition of the alkaline resin solution, the subsequent operations are those used in the art of making rayon yarn or sheets or films from viscose or other alkaline solutions of cellulose, such as copper oxid-ammonia solutions.

To obtain the best results in the present invention, the haze-producing substance should be in clear solution in the viscose or other solution as it leaves the spinneret and should be precipitated during acidification. By so doing, the precipitate is extremely fine, being of colloid fineness, and gives the best type of haze. In the usual operation of making thread, there is no time afforded for growth of the nuclei formed in precipitation into bodies of sensible size. The present operation adds to the uniformity of appearance or level appearance of the thread.

The most attractive appearance I have secured has been with toluene sulfo amid resins and particularly para toluene methylene sulfo amid. In making delustered viscose silk under the present invention, using para toluene methylene sulfo amid, about 5 per cent of this material (on the weight of the cellulose) is dissolved in caustic soda to give a clear transparent solution. This solution is admixed intimately with the viscose mass which is then extruded in the usual way into a salt solution or an acid solution to regenerate the cellulose as a filament or sheet. The precipitation of the cellulose throws out at the same time the dissolved resin in a white cloudy form, giving a slight internal haze to the dry and finished fiber, etc., making it more translucent than transparent and giving it an appearance by reflected light more nearly that of silk than the appearance of the untreated rayon. Viscose yarn produced by my process has good tensile strength and an electric insulating value greater than ordinary viscose yarn. Also my product is more water-resistant than ordinary viscose yarn, and consequently its wet strength is much higher.

When my new product is made in the form of threads or filaments the delustering effect is of prime importance and the electrical insulating properties secondary, for in such form the main use of the product is the fabrication of textile materials. In such textile materials the appearance is of great commercial importance and the delustering effect is very desirable. On the other hand when the product is in the form of sheets or films, like the so-called cellophane, the improvephane sheet possessing very high water resistance may become the major consideration. To secure the maximum improvement in electrical and water resistance the amount of resin may be increased to about 10 per cent. In this case the product has the same dull or delustered appearance although it is not so attractive to the eye as that obtained using about 5 per cent of the resin. In making rayon thread for electrical insulation, a similar increase in the amount of incorporated resin is desirable.

The present invention is an advance and an improvement upon some of my prior inventions in this art. In my Patent No. 1,564,664 I describe and claim a film-forming composition comprising a solution of toluene sulphoamid aldehyde resins and organo-oxy-cellulose compounds of the cellulose ester and ether type. In my Patent No. 1,730,417 I describe and claim a cellulosic artificial filament containing an electrical non-conducting resin, the said filament having improved electrical insulating properties. The filaments and films produced by the processes of these prior patents have a high and enduring gloss and do not have the delustered appearance of the products produced in accordance with the present invention, the resin not being in the same form or condition. In my copending application Ser. No. 322,094 I describe and claim processes of making delustered artificial silk from organo-oxy-cellulose compounds of the cellulose ester and ether type. The present invention relates to a different process of making another type of artificial silk having a similar delustered appearance from cellulosic compounds of the viscose or regenerated cellulose type, the present process being particularly adapted to the production of regenerated cellulose compositions.

My new products have a combination of desirable properties which readily suggest to those skilled in the art various applications and uses which have been hitherto unobtainable with regenerated cellulose materials. I may mention that the treated sheets produced by the present invention are useful in wrapping iron pipe to protect it from corrosion and passage of stray electrical currents which would accelerate corrosion, for instance iron pipe which is buried in the ground and used for carrying petroleum, gas, and other products. The present products are also useful in making telephone cables. My products possess a high degree of water resistance. When it is desired to have a cellophane sheet possessing very high water resistance to meet unusual or special conditions, sheets of regenerated cellulose produced by my present process may be varnished with a cellulose ester solution containing usually about two parts of para-toluene sulphoamid resins to one part of cellulose ester, both being dissolved in suitable solvents. The so-coated sheets have an exceedingly high water resistance.

What I claim is:—

1. In delustering artificial silk of the regenerated cellulose type formed by the extrusion process from alkaline solutions of cellulose, the process which comprises adding to an alkaline solution of cellulose a small proportion of an alkaline solution of a resinous body capable of being precipitated in acid solution, said resinous body being a resin of the toluene sulphoamid type, extruding the said mixture into an acid bath and coprecipitating the said resinous body and the cellulose, the said resinous body being precipitated out of solution as a fine haze.

2. In delustering artificial silk of the regenerated cellulose type formed by the extrusion process from alkaline solutions of cellulose, the process which comprises adding to an alkaline solution of cellulose a small proportion of an alkaline solution of a toluene sulphoamid resin, extruding the said mixture into an acid bath and coprecipitating the said toluene sulphoamid resin and the cellulose, the said toluene sulphoamid resin being precipitated out of solution as a fine haze.

3. As a new material an extruded body of a regenerated cellulose compound containing uniformly distributed therein a haze-like suspension of a solid resinous body precipitated therein said solid body being a resin of the toluene sulphoamid type, the amount of suspended solid being merely that which will make the regenerated cellulose body translucent; the said resinous body being one which is soluble in alkaline spinning solutions but precipitable by acid solutions.

4. As a new type of delustered rayon a rayon thread containing an acid precipitated, dispersed resinous solid, said resinous solid being a resin of the toluene sulphoamid type, the amount of this dispersed solid being merely sufficient to give an internal haze to the rayon.

5. A delustered regenerated cellulose material containing a toluene sulphoamid condensation product as a dispersoid phase, the said delustered regenerated celulose material being water resistant and possessing improved electrical insulating properties.

6. As a new type of delustered rayon, a rayon thread containing an acid precipitated, dispersed resinous solid, said resinous solid being a resin of the toluene sulphoamid type, the amount of this dispersed solid being about 5 per cent of the weight of the thread.

7. A delustered thread containing about 5 per cent of dispersed toluene sulphoamid resin.

8. In the manufacture of regenerated cellulose materials in the form of sheets, films, filaments and threads, the process which comprises extruding an alkaline solution of cellulose containing a toluene sulphoamid type resin dissolved therein and coprecipitating the cellulose and the resin.

9. In the manufacture of regenerated cellulose materials in the form of sheets, films, filaments and threads, the process which comprises extruding an alkaline solution of cellulose containing a toluene sulphoamid type resin dissolved therein into an acid bath and coprecipitating the cellulose and the resin by the action of said acid bath.

10. In processes of making regenerated cellulose materials the step which comprises coprecipitating cellulose and a toluene sulphoamid type resin.

In testimony whereof, I have hereunto affixed my signature.

HENRY A. GARDNER.

CERTIFICATE OF CORRECTION.

Patent No. 1,864,426.　　　　　　　　　　　　　　　　　　June 21, 1932.

HENRY A. GARDNER.

It is hereby certified that error appears in the printed specification of the above numbered patent requiring correction as follows: Page 2, line 48, strike out the syllable and words "phane sheet possessing very high" and insert instead ments in electrical insulation and; and that the said Letters Patent should be read with this correction therein that the same may conform to the record of the case in the Patent Office.

Signed and sealed this 4th day of October, A. D. 1932.

(Seal)　　　　　　　　　　　　　　　　　　　　　　　M. J. Moore,
　　　　　　　　　　　　　　　　　　　　　　Acting Commissioner of Patents.